(12) United States Patent
Lönneborg (10) Patent No.: US 7,628,001 B2
(45) Date of Patent: Dec. 8, 2009

(54) ISOSTATIC PRESS FOR HIGH PRESSURE TREATMENT

(75) Inventor: Nils-Gunnar Lönneborg, Västerås (SE)

(73) Assignee: Avure Technologies AB, Vasteras (SE)

( * ) Notice: Subject to any disclaimer, the term of this patent is extended or adjusted under 35 U.S.C. 154(b) by 604 days.

(21) Appl. No.: 10/550,194

(22) PCT Filed: Mar. 19, 2004

(86) PCT No.: PCT/SE2004/000406

§ 371 (c)(1),
(2), (4) Date: Sep. 21, 2005

(87) PCT Pub. No.: WO2004/082405

PCT Pub. Date: Sep. 30, 2004

(65) Prior Publication Data

US 2006/0180036 A1 Aug. 17, 2006

(30) Foreign Application Priority Data

Mar. 21, 2003 (SE) .................................... 0300764

(51) Int. Cl.
*B65B 55/02* (2006.01)
*A23B 4/26* (2006.01)

(52) U.S. Cl. ............................. 53/425; 53/431; 99/516; 422/295

(58) Field of Classification Search ................... 53/431, 53/432, 425, 523; 99/467, 485, 516; 422/295, 422/302
See application file for complete search history.

(56) References Cited

U.S. PATENT DOCUMENTS

| | | | | |
|---|---|---|---|---|
| 1,355,476 A * | 10/1920 | Hering | ......................... | 422/39 |
| 4,264,556 A | 4/1981 | Kumar et al. | ................ | 264/314 |
| 4,543,987 A * | 10/1985 | Ekeleme et al. | ............. | 137/540 |
| 4,582,682 A | 4/1986 | Betz et al. | ..................... | 419/68 |
| 5,213,029 A * | 5/1993 | Yutaka | ........................ | 99/474 |
| 5,229,152 A * | 7/1993 | Meldrum | ..................... | 426/327 |
| 5,288,462 A * | 2/1994 | Carter et al. | ................... | 422/39 |
| 5,316,745 A * | 5/1994 | Ting et al. | .................... | 422/295 |
| 5,433,142 A * | 7/1995 | Roth | ............................ | 99/474 |
| 6,162,392 A * | 12/2000 | Platz et al. | ..................... | 422/26 |
| 6,207,215 B1 * | 3/2001 | Wilson et al. | ................ | 426/521 |
| 6,393,977 B1 * | 5/2002 | Voisin | .......................... | 99/467 |
| 6,635,223 B2 * | 10/2003 | Maerz | .......................... | 422/33 |

(Continued)

*Primary Examiner*—Paul R Durand
(74) *Attorney, Agent, or Firm*—Harness, Dickey & Pierce, P.L.C.

(57) ABSTRACT

The present invention relates to an isostatic press for high pressure treatment of a product having a temperature below 0° C., said isostatic press comprising a pressure chamber adapted to contain a first pressure medium, and a container which is placeable in the pressure chamber. The container which is placeable in the isostatic press is adapted to hold the product and a second pressure medium, the container being closable to keep the first pressure medium separated from fluid communication with the second pressure medium. The container is further provided with a pressure transfer device adapted to transfer pressure from the first pressure medium to the second pressure medium, and a body which is made of a material with low adiabatic heat emission relative to adjoining substances, so that the body from adjoining substances absorbs heat, which is generated by adiabatic temperature rise during the high pressure treatment. The invention also relates to a method, a container, and a plant for high pressure treatment of a product having a temperature below 0° C. by means of an isostatic press.

40 Claims, 4 Drawing Sheets

U.S. PATENT DOCUMENTS 6,843,037 B2 * 1/2005 Nolfi, Jr. .................. 53/127
7,220,381 B2 * 5/2007 Ting et al. .................. 422/1
2002/0192109 A1 * 12/2002 Ting et al. .................. 422/33

* cited by examiner

ISOSTATIC PRESS FOR HIGH PRESSURE TREATMENT

CROSS-REFERENCE TO RELATED APPLICATION

This application is the National Stage of International Application No. PCT/SE2004/000406, filed on Mar. 19, 2004, which application is incorporated herein by reference in its entirety.

BACKGROUND OF THE INVENTION

1. Field of the Invention

The present invention relates to an isostatic press for high pressure treatment of a product in the pressure chamber of the isostatic press. The invention also relates to a method, a container, and a plant for high pressure treatment of a product by means of such an isostatic press.

2. Description of the Related Art

Isostatic presses of the type mentioned by way of introduction have different ranges of application. One range of application is isostatic high pressure treatment of products such as foods, drugs and cosmetics. Isostatic high pressure treatment of this type aims at inactivating undesirable microorganisms and enzymes in the product, thereby extending the shelf life of the product without detrimentally affecting the quality of the product. Compared with traditional methods for heat treatment, isostatic high pressure treatment is particularly suitable for foods since the natural flavors, scents and nutritive substances of foods are better preserved and the process times are shorter. Isostatic high pressure treatment implies that the product is subjected to the same pressure from all sides, which means that the product, even if it shrinks, will not change its geometric shape during treatment. The pressure in the isostatic press in high pressure treatment of foods typically amounts to about 2000-10000 bar. However, in some isostatic presses a higher pressure can be applied, such as up to about 15000 bar.

In isostatic high pressure treatment of foods and similar products, it is desirable to separate the food product from the pressure medium in the isostatic press. In prior-art technique, this is done by placing the food product in a package made of a flexible material that allows pressure transfer from the pressure medium to the product that is to be treated. Typically, said package is made as a flexible trough or a bag which is in direct contact with the pressure medium in the isostatic press. By increasing the pressure in the isostatic press, the increased pressure is transferred to the product through its flexible package, and the product will thus be treated.

In isostatic high pressure treatment of foods and similar products, the isostatic press and the pressure medium in the isostatic press typically have a temperature of about 10-120° C. The product that is to be subjected to high pressure treatment will during treatment assume substantially the same temperature as the isostatic press, which in many cases is also preferred. In prior-art technique, it is presently aimed at providing isostatic presses where the temperature of the product and the isostatic press should be significantly the same during the entire treatment. One problem remains, however, when products are to be subjected to high pressure treatment in a frozen state without thawing during the treatment, since it has been found difficult to use an isostatic press which in operation has the same low temperature as the frozen product.

Today there is a need to be able to subject frozen products to high pressure treatment, without thawing. Traditional isostatic presses do not present any possibilities of high pressure treatment of frozen products without thawing, and therefore improvements are required for the purpose of eliminating this problem.

BRIEF SUMMARY OF THE INVENTION

An object of the present invention is to provide an isostatic press which is constructed so that satisfactory high pressure treatment of products having a temperature below 0° C. is obtained where the temperature of the product does not exceed 0° C. at any time during the high pressure treatment.

Another object of the invention is to provide a method for high pressure treatment of products having a temperature below 0° C. where the temperature of the product does not exceed 0° C. at any time during the high pressure treatment.

A further object of the invention is to provide a container and a plant for high pressure treatment of products having a temperature below 0° C. where the temperature of the product does not exceed 0° C. at any time during the high pressure treatment.

The above objects and other objects that will be evident from the following description are achieved by an isostatic press, a method, a container, and a plant in accordance with the appended claims.

The invention is based on a knowledge that, by absorbing emitted adiabatic heat, the temperature of the product can be kept below 0° C. throughout the high pressure treatment. This can be achieved by relatively simple means using a body which during the high pressure treatment absorbs adiabatic heat emitted from substances adjoining the body.

According to one aspect of the invention, an isostatic press is provided, comprising a pressure chamber adapted to contain a first pressure medium and a placeable closed container adapted to hold a second pressure medium and a product having a temperature below 0° C., said container separating the first pressure medium from the second pressure medium. Separated pressure media according to the invention make it possible to use pressure media of different qualities in the container and the pressure chamber respectively, when these are not in fluid communication with each other. According to the invention, the container is provided with a pressure transfer device adapted to transfer pressure from the first pressure medium to the second pressure medium. The container also comprises a body which is made of a material having low adiabatic heat emission relative to adjoining substances, the body being arranged so as to absorb emitted adiabatic heat from adjoining substances during the high pressure treatment.

Thus, there are created completely new conditions of subjecting products having a temperature below 0° C. to a high pressure treatment by means of an isostatic press where heating of the product due to thermal transfer from the surroundings is counteracted in a simple and effective manner. The possibility of counteracting an increase of heat is of great interest when frozen products that are not allowed to thaw during the high pressure treatment are to be treated by means of an isostatic press.

When a system is pressurized, energy will be transferred to the system, which results in an increase of the temperature of the pressurized substances. The temperature rise depends on the compressibility of the substances, i.e., soft substances will be heated more than hard substances. In isostatic high pressure treatment, the temperature will consequently rise in all compressible substances according to a known pattern, referred to as adiabatic temperature rise.

In an isostatic press according to the invention, the temperature of compressible substances will rise due to said adiabatic temperature rise in the high pressure treatment. The temperature of the body included in the container and having low adiabatic heat emission will during pressurizing rise negligibly relative to said compressible substances. During the high pressure treatment, the body having a lower temperature relative to the surroundings will consequently absorb adiabatic heat emitted from adjoining substances to the body.

By arranging a body having a large thermal mass in the container, a substantially large amount of adiabatic heat emitted from substances adjoining the body can be absorbed by the body in an effective manner. By a body having a large thermal mass is meant in this application text a body which from adjoining substances can absorb emitted heat with a subsequent temperature rise in portions of the body, during the increase of pressure in the isostatic press, which is below the temperature obtained in the product and the second pressure medium due to the adiabatic temperature rise. A suitable dimension of the body is determined by how much heat is to be absorbed.

The amount of generated heat due to the increase of pressure during the high pressure treatment depends in turn on the adiabatic temperature rise characteristic of adjoining substances, the volume of the substances and the pressure applied. By providing a closed container comprising a heat-absorbing body, a very advantageous counteraction of the temperature of the product in the container rising due to heating from adjoining substances is made possible, which cannot be achieved by traditional isostatic presses where the product is subjected to high pressure treatment in a flexible trough, a bag or a similar thin-walled storing device.

The body in the container is preferably made of a material with high heat capacity, such as metal, to provide a good heat-absorption quality from the surroundings. It is advantageous to make the body of stainless steel or some other non-corrosive material. Stainless steel has further advantages over many other metals by giving a heat capacity suitable for the purpose ($C_p \approx 0.48$ kJ/kg·K), being easy to machine and being cheap. It is also possible to make the body of a plurality of materials with different characteristics, which in different layers together constitute the body. It will be appreciated that the body can be arranged in many different ways in the container in order to achieve the above objects.

An isostatic press suitable for the purpose comprises a container where the body constitutes at least part of the container wall. This is achieved preferably by making at least part of the container wall of a material having low adiabatic heat emission and low thermal resistivity, whereby this part of the wall constitutes said body that absorbs heat during the high pressure treatment as described above. For the container to absorb the adiabatic heat emission in an effective manner, according to the above-described body, the container wall is made in such a manner that it constitutes a thermal mass which is proportional to the amount of emitted heat during the high pressure treatment from substances adjoining the wall. The container can be designed with different geometric shapes, such as preferably cylindrical or some other shape suitable for the purpose. To obtain a large thermal mass which in an effective way can absorb emitted heat from adjoining substances, a significantly large part of the container wall consists of the body. The heat-absorbing body can in a preferred elongate cylindrical container, for instance, constitute at least the curved cylindrical wall, but also the ends of the cylinder can advantageously consist of a heat-absorbing material with a large thermal mass.

The container is advantageously at least partly provided with a thermal insulation. By keeping the first pressure medium in the isostatic press and the second pressure medium in the container separated by means of an at least partly insulated closed container, a thermal transfer between the first pressure medium and the second pressure medium before, during and after the high pressure treatment is counteracted, the temperature of the second pressure medium and, consequently, of the product being only marginally affected by the temperature of the first pressure medium surrounding the container.

In the case where the insulation consists of a compressible substance, which characterizes many insulating materials, such as rubber, the insulation will be adiabatically heated during the high pressure treatment due to compression of the insulation. The heat emitted from the insulation will heat the second pressure medium and the product, if this is not counteracted, and therefore the insulation is preferably arranged on the outside of the container wall. By arranging the insulation on the outside of the container wall, the adiabatic heat emission from the insulation, which arises when this is compressed during the high pressure treatment, will be absorbed by the container wall. Thus it will be counteracted that the adiabatic heat emission from the insulation affects the temperature of the product included in the container. The insulated container is preferably arranged with a wall which has a large thermal mass adapted to absorb adiabatic heat emitted both from the insulation and from the product and the second pressure medium at least next to the wall in the container, thus counteracting a temperature rise in the product due to thermal transfer from the surroundings in the high pressure treatment.

As an example of the container which is placeable in the isostatic press, the wall has a thermal mass of about 80 kJ/degree K. The insulation arranged round the wall and the bottom has, at a preferred pressure in the pressure chamber of about 6000 bar, a thermal heat emission of about 120 kJ due to adiabatic heat emission. The heat emitted from the insulation thus contributes to the temperature of the wall rising by about 1.5° C. during the high pressure treatment. During the high pressure treatment, the wall will also absorb adiabatic heat emitted from the second pressure medium and the product at least next to the wall, which further contributes to a temperature rise of about 5° C. at the pressure stated above. It will be appreciated that the above values of thermal mass and emitted heat are only exemplifying for an embodiment of the container where many modifications of the design of the container can be made within the scope of the invention.

According to one embodiment of the invention, the container is arranged with a previously described wall which serves as the body for heat absorption of adiabatic heat emission from the insulation arranged on the outside of the wall and also the product and the second pressure medium at least next to the wall in the container. Outside said wall, which forms an inner wall, an outer wall is arranged which forms an interspace between the inner and the outer wall, which interspace is adapted to accommodate a thermal insulation which counteracts that the first pressure medium in the pressure chamber thermally affects the product and the second pressure medium in the container. Typically, the insulation consists of a thermal insulating substance in the form of polymer, preferably natural rubber or EPDM (ethylene propylene rubber). However, it is possible to provide a container where the interspace consists of a fluid, vacuum or other thermal insulation. For an insulation of EPDM (ethylene propylene rubber) or natural rubber, a thickness of at least 5 mm, preferably 5-15 mm, particularly 8-12 mm, has been found suitable for use in the present invention.

In the case where the thermal insulation consists of a substance, such as EPDM (ethylene propylene rubber) or natural rubber, the outer wall serves to protect the insulation from mechanical damage in the handling of the container, and to support and hold the structure of the container together. The outer wall, preferably made of substantially thin stainless steel sheet, also allows a container which is easy to handle and which is hygienic because of its smooth surfaces. It is preferred to use the outer wall to fasten lifting hooks or similar means for use when the container is to be lifted and transported. However, it is also possible to fasten lifting hooks or similar means in the inner wall for the same purpose, in which case the outer wall can be excluded, if desired. With an insulation of natural rubber or EPDM, it is advantageous to fix this to the inner wall of the container by gluing. If the container is arranged with an outer wall, this can hold the insulation in place against the inner wall of the container, thus making it possible to exclude fixing, if convenient.

The inner wall is preferably made of stainless steel to a desired geometry. The thickness of the inner wall is dimensioned depending on how much heat is to be absorbed during the high pressure treatment due to adiabatic temperature rise in substances adjoining the wall. The amount of heat emitted from these substances in turn depends on the adiabatic temperature rise characteristic of these adjoining substances, the volume of the substances and the pressure applied in the high pressure press. A wall thickness of the inner wall of at least 5 mm, preferably 5-15 mm, particularly 8-12 mm, has been found convenient for use in the present invention.

Pressure transfer from the first pressure medium in the isostatic press to the second pressure medium in the container is used to subject the product held in the container to high pressure treatment. The inner wall of the container is preferably substantially rigid and has no pressure transferring effect between the first pressure medium and the second pressure medium, which is a significant difference compared with prior art where flexible troughs or bags in themselves constitute the pressure transferring effect. In the present invention, use is made of a container with a preferably rigid inner wall to obtain the previously mentioned body with low adiabatic heating relative to adjoining substances, the body absorbing heat from adjoining substances during the high pressure treatment. For an isostatic press according to the invention, the pressure transfer occurs using a pressure transfer device which is included in the container and which is at least partly movably arranged relative to the inner wall of the container. In case of a pressure change in the first pressure medium, the pressure transfer device will enable a change of volume of the second pressure medium for the purpose of eliminating the pressure difference between the first pressure medium and the second pressure medium.

To effect pressure transfer from the first pressure medium in the pressure chamber to the second medium in the container, the pressure transfer device is, in one embodiment of the invention, designed as a loose piston. By loose piston is meant an at least partly movably and loosely arranged piston relative to the inner wall of the container, the loose piston enabling a change of volume of the second pressure medium for the purpose of eliminating a possible pressure difference between the first pressure medium and the second pressure medium. The loose piston is arranged so as to be at least partly able to move along substantially the entire inner length of the container in order to follow variations of the level of the second pressure medium due to transferred pressure variations of the first pressure medium. The pressure transferring device in the form of a loose piston is sealingly arranged in the container so that it separates the first pressure medium in the pressure chamber from fluid communication with the second pressure medium in the container. Typically, the loose piston may constitute a removable and closable closure of the inner volume of the container. The loose piston thus allows the container to open for supply and discharge of products and said second pressure medium and, thus, subsequently to be reclosed. However, it is also possible to achieve the same function by using pressure transfer device of another design, such as membrane, bellows etc.

In another embodiment according to the invention, the pressure transfer device is a flexible membrane which is partly movable relative to the inner wall of the container, a possible pressure difference between the first pressure medium and the second pressure medium being eliminated by the mobility of the membrane enabling a change of volume of the second pressure medium in the container relative to the pressure in the first pressure medium. The membrane fits tightly to the container to separate the first pressure medium in the pressure chamber from fluid communication with the second pressure medium in the container. Preferably the membrane is attached to the container by a detachable clamping device, such as a rubber band, to allow the membrane to be used as a removable and closable closure of the inner volume of the container when supplying and discharging the product and the second pressure medium.

The pressure transfer device is designed so as to constitute a relatively small surface, but large enough to effect pressure transfer, of the total surface of the container, which surface is otherwise wholly or partly insulated. By forming the pressure transfer device with a surface which is small relative to the entire container, a thermal transfer between the first pressure medium and the second pressure medium is counteracted. It is particularly preferred to form the pressure transfer device with an insulating and heat-absorbing effect, for instance with an insulating polymer on the outside of a metal as mentioned above, in order to minimize the above-mentioned effect of thermal transfer. In a preferred embodiment of the invention where the container is formed as an elongate cylinder, the pressure transfer device typically constitutes one end of the container. It will be appreciated that the pressure transfer device of the container can be designed in various ways in addition to those described above, which are only exemplary embodiments.

As a rule, the container is dimensioned according to the size of the pressure chamber of the isostatic press in order to utilize the volume in an effective way. Typically the volume of the pressure chamber can be between 35 and 600 l for different isostatic presses, in which case the container will be unwieldy if a single container is used in large isostatic presses. To prevent this, an isostatic press according to the invention makes it possible to arrange a plurality of containers in the pressure chamber for simultaneous treatment of the product in each container. Since each high pressure treatment is associated with high costs, it is economy to be able to treat large volumes on the same occasion by being able to arrange a plurality of containers in the pressure chamber. By stacking the containers with a preferred cylindrical shape in the pressure chamber, the volume in the pressure chamber is effectively utilized. The containers are then designed in such a manner as to allow, for instance through holes in the outer wall of the containers, free passage of the first pressure medium to the pressure transfer device of each container.

According to embodiments of the invention, it is preferred to arrange a valve on the container to make it possible to empty said container of a residual volume of air which possibly remains after supplying the product and the inner pressure medium. Preferably this valve is arranged in connection with the pressure transfer device.

Due to the advantageous embodiment involving a closed insulated container according to the invention, an isostatic press is provided, which is particularly suitable for high pressure treatment of frozen products held in the container. Such frozen products may consist of, for instance, foods, drugs or cosmetics. It will be appreciated that, in addition to the examples of products mentioned above, there will be other products in a frozen state which can be subjected to high pressure treatment by means of the present invention. It is crucial for the frozen product not to thaw during the high pressure treatment since this can often cause a detrimental effect on the quality of the product.

For example, when arranged in the isostatic press, the container and the product held in the container and said second pressure medium have a temperature below 0° C., preferably −5 to −30° C., such as −10 to −25° C. The second pressure medium in the container must be such as to be in a liquid state at this low temperature to function as a pressure medium. The second pressure medium in the container preferably is ethanol or some other alcohol, or a mixture of water and alcohol.

The isostatic press and the first pressure medium in the isostatic press typically have a temperature above 0° C., preferably between +4 and +8° C. Due to the increase of pressure during treatment, there will be adiabatic temperature rise both in the first pressure medium in the isostatic press and in the second pressure medium and the product in the container, which results in thawing of the product if a thermal transfer from the first pressure medium to the second pressure medium is not counteracted. Instead of, for instance, the entire isostatic press being cooled to substantially the same temperature as the frozen product that is to be treated, an isostatic press according to one embodiment of the present invention can be used. This can be provided by forming the container, which is placeable in the isostatic press, with a thick wall which for a limited time will absorb emitted heat from substances adjoining the wall and, thus, counteract that the temperature of the product rises due to thermal transfer between the first pressure medium and the second pressure medium. If the high pressure treatment proceeds for a longer time, or if the time for conveying the container from the press to a cooled space is significantly long, it is preferable to use a preferred embodiment according to the invention. According to this preferred embodiment, the isostatic press comprises a closed insulated container which is placeable in the isostatic press and which is formed with a thick inner wall absorbing adiabatic heat emitted from the insulation and also from the product and the pressure medium at least next to the inner wall, and counteracting that the first pressure medium in the pressure chamber heats the second medium and the product in the container, thereby making it possible to keep the frozen product in a frozen state throughout the high pressure treatment. Use of an isostatic press which is cooled to substantially the same temperature as the frozen product has been found difficult to apply industrially since this causes great problems with the strength of material of the isostatic press and above all, is very costly and complicated to provide.

Most frozen products which are convenient for high pressure treatment by means of the present invention, such as foods, drugs and cosmetics, have a characteristic in terms of heat change similar to water in high pressure treatment. The temperature at which at least parts of the frozen product change from solid phase to liquid phase is dependent on the pressure in the container. Thus it is necessary for the temperature of the product in the high pressure treatment to be kept below the temperature relative to the pressure where a phase change occurs. As an example, it can be mentioned that typically in adiabatic compression of substances with a characteristic in terms of heat change similar to water there prevails a minimum temperature of about −21° C. at a pressure of about 2100 bar where the phase change occurs. It has been found that the product nevertheless can have an initial temperature which is higher, typically −18° C., than the temperature at which the phase change occurs and still remain in solid phase throughout the high pressure treatment. This knowledge is based on the fact that melting heat is required in the phase change which lowers the temperature of the product so as to be below the temperature at which the phase change otherwise occurs.

By means of an isostatic press according to the invention, it is also possible to subject products to high pressure treatment, which are in a liquid state at low temperatures, such as below 0° C., preferably −5 to −30° C., particularly −10 to −25° C. In the case where the product is liquid, it is preferred to let the liquid product itself constitute the second pressure medium in the closed container.

When frozen products in a cooled container are to be subjected to high pressure treatment according to the description above, it is advantageous to use a first pressure medium in the pressure chamber of the isostatic press with a freezing point below the temperature of the cooled container (below 0° C.) to prevent the first pressure medium in the isostatic press next to the container from freezing. For instance, the first pressure medium in the pressure chamber of the isostatic press can typically be a mixture of water and alcohol (such as glycol) or some other liquid with a low freezing point.

In a method for high pressure treatment of frozen products by means of an isostatic press according to the invention, the product which is to be treated, the container and the second pressure medium are provided in a cooled state with a temperature below 0° C., preferably −5 to −30° C., such as −10 to −25° C. The product, the second pressure medium and the container can be cooled together, or each separately. The product is preferably stored in a frozen state, for example, in a freezing chamber before it is placed in the container, the container and the second pressure medium being cooled in advance to substantially the same temperature as the product. An alternative method is to cool the product, the container and the second pressure medium on the same occasion in a freezing device, such as a freezing chamber. Additional methods are possible where the important thing is that the container and the second pressure medium have substantially the same temperature as, or a lower temperature than, the frozen product when the container holding the frozen product and the second pressure medium is placed in the isostatic press.

Having placed the frozen product and the second pressure medium in the container, the container is closed. In a preferred embodiment, the container is closed by the pressure transfer device formed as a loose piston or a membrane. Closing of the container is advantageously made in an environment with substantially the same temperature as the cooled container, such as a freezing chamber.

Having closed the cooled container, it is emptied of any remaining residual volume of air. The residual volume of air is discharged through a valve, which in a preferred embodiment is placed on the pressure transfer device. By opening the valve and then compressing the contents of the container, preferably manually, by the pressure transfer device until liquid escapes through the valve, an indication can be obtained that the major part of the residual volume of air has been discharged. Having discharged the residual volume of air, the valve is closed. The discharge of the residual volume of air occurs before the container is pressurized in the pressure chamber of the isostatic press; preferably discharge occurs even before the container is placed in the pressure chamber in connection with the closing of the container in an environment with substantially the same temperature as the frozen product.

The container holding the frozen product and the second medium is placed in the pressure chamber of the isostatic press. In a preferred embodiment of the invention, the container is placed on the bottom of the pressure chamber and surrounded by the first pressure medium in the pressure chamber. According to one embodiment, the first pressure medium is already placed in the pressure vessel when the container is placed in the same, but it is also possible, according to another embodiment, to supply the first pressure medium to the pressure vessel after having placed the container in the pressure vessel. The cooled container holding the product and the second pressure medium is conveyed from the cooled environment to the isostatic press, for example, by means of a lifting device or some other conveying device. For the frozen product to be kept as cold as possible, the time from the container leaving the cooled environment until the pressure chamber is pressurized should be minimized. This can be achieved by placing the isostatic press close to the cooled environment, such as a freezing chamber. If a plurality of containers holding products that are to be treated should be placed in the pressure chamber, this is done in the same way as described above.

The isostatic press containing the container is pressurized by increasing the pressure of the first pressure medium. This can be done in various ways according to prior-art technique. Preferably, the first pressure medium is pumped into the pressure vessel, the pressure chamber being pressurized. The increased pressure of the first pressure medium is transferred to the second pressure medium by the above-mentioned pressure transfer device of the container to achieve pressure equalization between the first and the second pressure medium, the second pressure medium in the container being compressed and in turn transferring the pressure change to the product that is to be treated, which product is advantageously enclosed in a bag or a similar flexible package protecting the product from being in direct contact with the second pressure medium. Depending on which type of product is to be subjected to high pressure treatment, the pressure in the pressure vessel is increased to 2000-15000 bar, preferably 2000-10000 bar, particularly 5000-7000 bar. The increased pressure is typically applied for 0.5-20 min, preferably 0.5-10 min, particularly 2-7 min.

By using an isostatic press according to the invention, it will be possible to keep the temperature of the product below 0° C. throughout the high pressure treatment. This is achieved by selecting a container with a preferred design according to the above description. Heat generated in compressible substances due to the increased pressure is absorbed by means of the above-mentioned inner wall of the container, thereby counteracting a temperature rise of the product due to heat transfer from the surroundings through the inner wall. In the preferred case where the product to be treated is in a frozen state when placed in the isostatic press, it is possible to counteract in the same way as described above that the product thaws at any time during the high pressure treatment. In the case where the initial temperature of the frozen product is selected so that the product at any time during the pressure rise in the pressure chamber assumes a temperature which is close to the limit for phase change between solid phase and liquid phase, the consumption of melting heat in the phase change is used to lower the temperature of the product to a level below the critical temperature where the phase change otherwise occurs.

It is possible to treat the product enclosed in the container by applying one or more successive high pressure pulses. By applying several short pulses in succession, the adiabatic heating of the insulation as well as the product and the second pressure medium will be short, the temperature of the compressible substances resuming its initial temperature between the pressure pulses, which results in the total amount of absorbed heat of the inner wall being smaller than in the case involving a continuous longer pulse.

After the product enclosed in the container being subjected to high pressure treatment, the pressure chamber of the isostatic press will be decompressed. Decompression is effected according to known methods in prior-art technique. In a preferred embodiment of the isostatic press, at least parts of the first pressure medium are removed from the pressure chamber, whereby the pressure falls. The pressure transfer device of the container allows the second pressure medium in the container to expand in order to eliminate the pressure difference between the first and the second pressure medium. The isostatic press is opened when the pressure in the pressure chamber and the container has become substantially the same as that of the environment surrounding the isostatic press, after which the container is removed from the pressure chamber and transported away for further treatment. To prevent the product from thawing after the high pressure treatment, the product should as soon as possible be transported to a cooled environment, such as a freezing chamber.

A plant for high pressure treatment of a product comprises in a preferred embodiment a freezing device and an isostatic press according to the invention. The freezing device, which in a preferred embodiment is a freezing chamber, is used to cool the container. It is also possible to cool the second pressure medium and/or the product together with the container in the freezing device. Alternatively, the frozen product and/or the pressure medium can be stored in a cooled state in another chamber and be conveyed to the freezing device to be placed in the cooled container. The container holding the second pressure medium and the product is advantageously stored in the freezing device until the container is to be placed in the pressure chamber of the isostatic press for the purpose of subjecting the product to high pressure treatment.

An isostatic press or container or plant of the type described above can preferably be used to subject products to high pressure treatment, which have a temperature below 0° C., such as foods, drugs or cosmetics.

BRIEF DESCRIPTION OF THE SEVERAL VIEWS OF THE DRAWINGS

The invention will now be described in more detail with reference to the accompanying schematic drawings which by way of example illustrate embodiments of the invention.

DETAILED DESCRIPTION OF THE INVENTION

Figure 1:
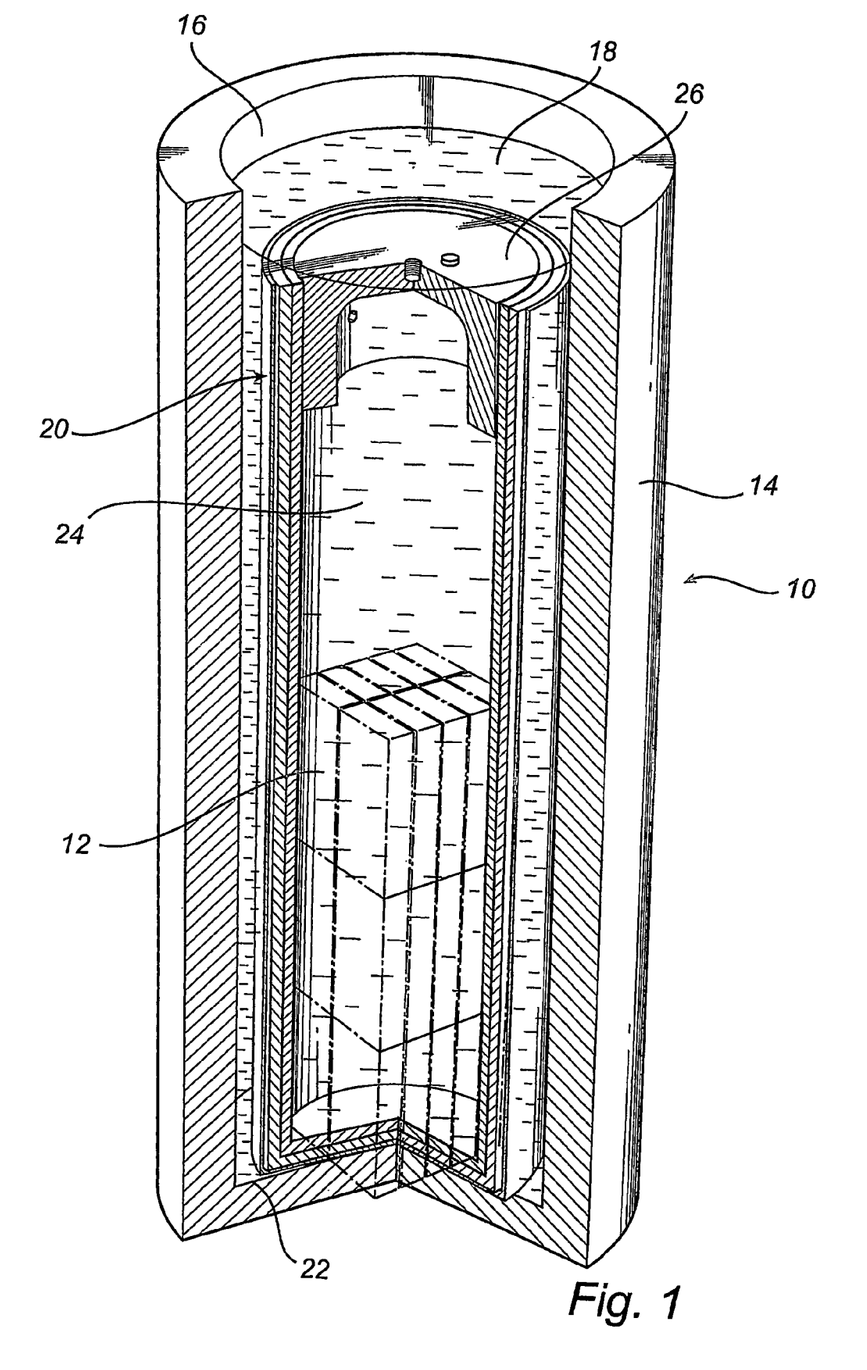
FIG. 1 is, partly in cross-section, a schematic perspective view of an isostatic press according to an embodiment of the invention.

FIG. 1 is a perspective view of an isostatic press 10 for high pressure treatment of a product 12, partly in cross-section, according to one embodiment of the invention. The isostatic press 10 comprises an openable top lid (not shown) and a pressure vessel or a pressure cylinder 14 which defines a pressure chamber 16, inside which a high pressure (such as up to 15000 bar) is generated for treatment of a product 12. The pressure chamber 16 contains a first outer pressure medium 18 in the form of a mixture of water and glycol which is used to pressurize the isostatic press 10. The outer pressure medium 18 has a temperature of +4 to +8° C. Moreover the outer pressure medium 18 surrounds a cylindrical container 20 which is placeable in the pressure chamber and rests on the bottom 22 of the pressure chamber. The container 20 is adapted to hold a second inner pressure medium 24 in the form of ethanol and a frozen product 12 which is to be subjected to high pressure treatment, which product is arranged in a plurality of packages. Before the high pressure treatment, the container 20, the inner pressure medium 24 and the product 12 are cooled to a temperature between −10 and −25° C. The upper end of the cylindrical container 20 is provided with a pressure transfer device 26 in the form of a loose piston for pressure transfer between the outer pressure medium 18 and the inner pressure medium 24. The container 20 does not occupy the entire length of the pressure chamber 16, the outer pressure medium 18 being allowed to lie between the container 20 and the pressure vessel lid (not shown) to be able to act one the pressure transfer device 26 of the container. For the sake of clarity, two alternative embodiments of the container 20 are illustrated in separate cross-sectional views in FIGS. 2 and 3 respectively, the same reference numerals being used for equivalent elements in FIG. 1 and FIG. 2.

Figures 2, 3:
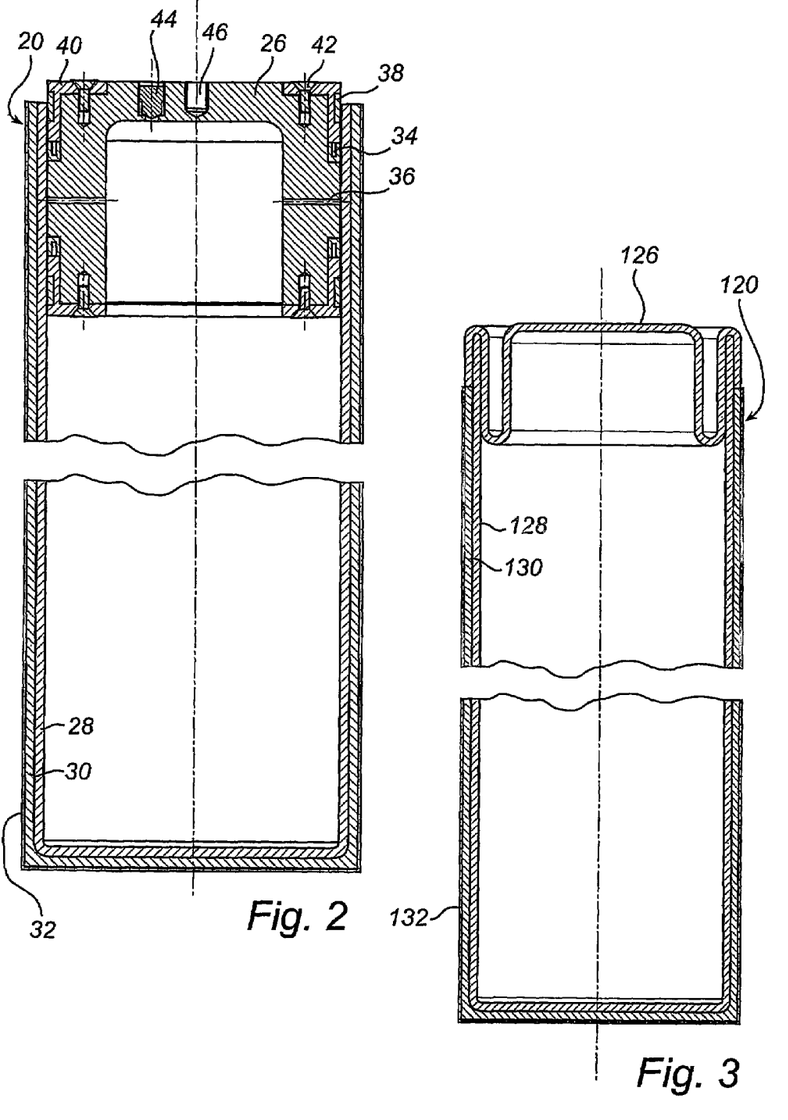
FIG. 2 is a cross-sectional view of the container which is placeable in the isostatic press in FIG. 1 and comprises a loose piston for pressure transfer.
FIG. 3 is a cross-sectional view of an alternative embodiment of the container in FIG. 2, which comprises a membrane for pressure transfer.

The containers 20; 120 in FIGS. 2 and 3, respectively, comprise a 10 mm thick inner wall 28; 128 made of a material, such as stainless steel, with low heat resistivity and low adiabatic heating, the inner wall 28; 128 being heated only marginally due to the increased pressure in the isostatic press 10 during pressurization. The inner wall 28; 128 of the containers 20; 120 forms the inner volume of the containers 20; 120 which is adapted to hold the inner pressure medium 24 and the frozen product 12 which is to be subjected to high pressure treatment.

Moreover, the containers comprise a 10 mm thick insulation 30; 130 arranged round the outside and bottom of the inner wall 28; 128. The insulation 30; 130 is adapted to counteract that heat is transported between the inside of the container 20; 120 and the outside thereof through the inner wall 28; 128. The insulation 30; 130 is made of EPDM (ethylene propylene rubber) or natural rubber. An outer wall 32; 132 is arranged outside the insulation 30; 130 to keep the construction together and at the same time protect the insulation 30; 130 from mechanical damage in the handling of the container. The outer wall 32; 132 is made of a substantially thin stainless steel sheet with a thickness of about 2 mm. The containers 20; 120 shown in FIG. 2 are about 1700 mm long and have a diameter of about 300 mm.

For the containers 20; 120 shown in FIGS. 2 and 3, respectively, the inside of the inner wall 28; 128 directed to the centre of the container 20; 120 is in direct contact with the inner pressure medium 24 in the container 20; 120, and the outside of the inner wall 28; 128 directed away from the centre of the container 20; 120 is in direct contact with the insulation 30; 130. In high pressure treatment, both the product 12 and the inner pressure medium 24 in the container 20; 120 and also the insulation 30; 130 will emit adiabatic heat due to compression. Since the inner wall 28; 128 has a thermal mass which is proportional to the emitted adiabatic heat, said heat will be absorbed by the inner wall 28; 128 of the container 20; 120, thereby counteracting a temperature rise of the product 12 due to adiabatic temperature rise in the insulation 30; 130 and heat emission from the outside of the container 20; 120 through the inner wall 28; 128.

The container 20 in FIG. 2 is at one end provided with a pressure transfer device 26 in the form of a cylindrical loose piston, which is arranged as a closable lid. The loose piston 26, which is in contact with the outer pressure medium 18 on the side facing away from the container 20 and with the inner pressure medium 24 on the side facing the container 20, is movably arranged in the longitudinal direction of the container 20 to allow pressure transfer from the outer pressure medium 18 to the inner pressure medium 24. When the pressure of the outer pressure medium 18 in the isostatic press 10 is raised, the loose piston 26 will move downwards in the longitudinal direction of the container 20 due to the transferred force from the outer pressure medium 18, whereby the inner pressure medium 24 will be compressed. When the pressure of the outer pressure medium 18 in the isostatic press 10 is lowered, the loose piston 26 will correspondingly move upwards in the longitudinal direction of the container 20 due to the force generated by the higher pressure of the inner pressure medium 24 in the container 20 relative to the outer pressure medium 18. At the upper and lower edge of the longitudinal sides of the loose piston 26 seals 34 extending round the circular surface of the loose piston 26 are arranged to fit tightly against the inner wall 28 of the container. The seals 34 are so-called sleeve seals and intend to separate the inner pressure medium 24 in the container 20 from fluid communication with the outer pressure medium 18 in the pressure chamber 16. Ducts 36 are arranged to connect the space between the seals 34 on the longitudinal outside of the loose piston 26 with the inside of the container 20, these ducts 36 causing the pressure in the container 20 and in the space between the seals 34 on the outside of the loose piston 26 to be the same all the time. On the longitudinal sides of the loose piston 26 there are at the upper and lower edge also slide rings 38 arranged to allow guiding of the loose piston 26 towards the inner wall 28 of the container 20. Seals 34 and slide rings 38 are mounted on the loose piston 26 by means of two angled circular shelves 40 forming the upper and lower edge between the longitudinal and transverse sides of the loose piston 26, said shelves 40 being detachably arranged by means of screws 42 to allow easy replacement in case seals 34 and slide rings 38 are worn out. The loose piston 26 is provided with a valve 44 arranged at the upper transverse side of the loose piston 26 directed away from the container 20. The valve 44 which in an embodiment of the invention is a screw is used to empty the container 20 of a possible residual volume of air which remains after supplying the inner pressure medium 24 and the product 12 which is to be treated. The upper transverse side of the loose piston 26 directed away from the container 20 comprises also a threaded hole 46 which constitutes an attachment for a handle, lifting hook or similar means adapted to be used in removal and insertion of the loose piston 26 in the container 20.

FIG. 3 shows a container 120 having the same properties as described above for the container 20 in FIG. 2, except that the closable and pressure-transferring lid is a membrane 126. The membrane 126 is tight-fitting round the longitudinal sides of the container 120 for the purpose of separating the inner pressure medium 24 in the container from fluid communication with the outer pressure medium 18 in the pressure chamber 16. By the membrane 126 being made of a substantially flexible material, such as rubber, the pressure of the outer pressure medium 18 on the outside of the container 120 can be transferred to the inner pressure medium 24 on the inside of the container 120. The membrane 126 is fixedly arranged on the wall of the container 120, the membrane 126 having a flexible configuration which allows parts of the membrane 126 to move in the longitudinal direction of the container 120 by elastic deformation in order to transfer pressure variations in the outer pressure medium 18 to the inner pressure medium 24. To obtain a substantially long length of stroke, the membrane 126 is U-shaped with folded material at the edges which allows a so-called "over centre motion" in compression of the inner pressure medium 24 in the container 120. The membrane 126 is preferably mounted on the container 120 using a rubber band (not shown) which provides a clamping effect, which is maintained when the membrane 126 is compressed in the high pressure treatment.

Figure 4:
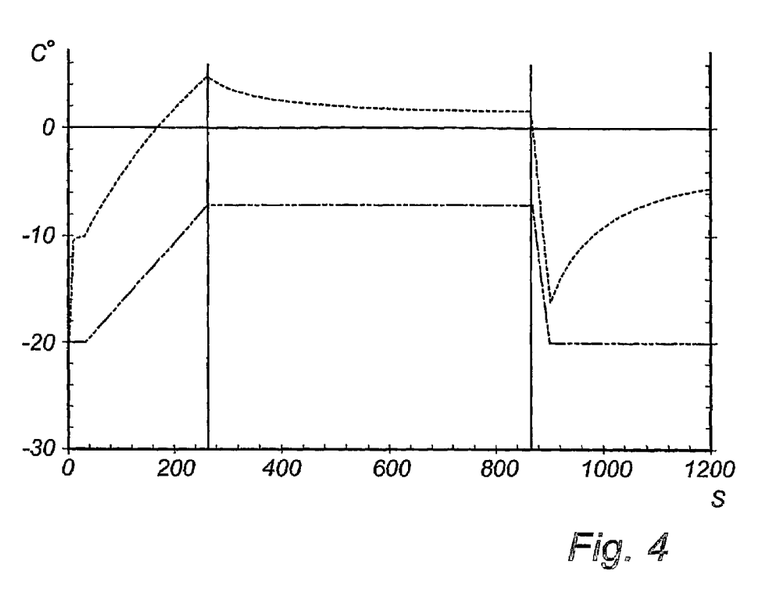
FIG. 4 shows a diagram of how the temperature of a product held in a traditional flexible thin-walled plastic package is affected during a high pressure treatment.

FIG. 4 shows how the temperature of a frozen product, enclosed in a thin-walled plastic package of the type used in prior-art isostatic presses, varies over time during a high pressure treatment in an isostatic press. The plastic package is surrounded by an outer pressure medium in the isostatic press, preferably a mixture of water and glycol. The plastic package contains, in addition to the product, a second pressure medium, transferring pressure to the product, in the form of a liquid with a freezing point below 0° C., such as ethanol. A first double-dot-dashed curve shows the temperature of the product in the centre of the plastic package, and a second dashed curve shows the temperature of the product next to the wall of the plastic package. The plastic package is about 1700 mm long and has a diameter of about 300 mm. The diagram shows on the horizontal axis the time in seconds and on the vertical axis the temperature in ° C.

At the time 0 s when the plastic package containing the ethanol and the product is placed in the pressure chamber of the isostatic press, it has a temperature of –20° C. The dashed curve shows how the temperature of the product next to the wall of the plastic package quickly rises from about –20° C. at the time 0 s when the plastic package is placed in the pressure chamber to about –10° C. at the time 40 s when the pressure chamber is pressurized. This temperature rise occurs due to heat transfer from the mixture of water and glycol in the pressure chamber having a temperature of about +4° C. to the product next to the wall of the plastic package. The double-dot-dashed curve shows how the product in the centre of the plastic package substantially keeps its initial temperature –20° C. from the point when it is placed in the isostatic press at the time 0 s up to the time 40 s when the pressure chamber is pressurized. During pressurization of the pressure chamber of the isostatic press, the temperature of the product and the ethanol rises due to adiabatic temperature rise. The pressure is increased to a level of about 6000 bar which is kept constant for about 600 s The keeping of the constant pressure of 6000 bar is maintained from the time 260 s to the time 860 s, which in FIG. 4 is indicated by two vertical unbroken lines.

At the time 260 s when the pressure has reached 6000 bar in the pressure chamber, the double-dot-dashed curve shows how the temperature of the product in the centre of the plastic package has risen by about 13° C. to about –7° C. due to adiabatic heating. The dashed curve shows at the same time how the product next to the wall of the plastic package has risen by about 15° C. to about +5° C. in consequence of the pressurization. The greater temperature rise of the product next to the wall of the plastic package relative to the product in the centre of the plastic package is due to the fact that the product next to the wall of the plastic package absorbs heat from the mixture of water and glycol, which also adiabatically rises in temperature. During the pressurization of the isostatic press which lasts for about 240 s, some generated adiabatic heat of the product next to the wall of the plastic package will be emitted to the surrounding mixture of water and glycol when the temperature of the product exceeds the temperature of the mixture of water and glycol (+4° C.).

During the keeping of the pressure which lasts for about 600 s before the pressure vessel begins to be decompressed, the double-dot-dashed curve shows how the temperature of the product in the centre of the plastic package is insignificantly affected by the surroundings. The dashed curve shows how the temperature of the product next to the wall of the plastic package falls from about +5° C. at the time 260 s when the pressure of 6000 bar has been reached to +2° C. at the time 860 s when the pressure chamber begins to be decompressed. This temperature reduction of the product next to the wall of the plastic package is due to the fact that the colder product and ethanol further inside the plastic package will absorb heat from the product at the wall of the plastic package.

At the time 920 s when the pressure chamber has been decompressed, the double-dot-dashed curve shows that the product in the centre of the plastic package, where substantially no, or a negligible, heat exchange has occurred, substantially resumes its initial temperature –20° C. due to adiabatic temperature reduction. The dashed curve shows at the same time how the temperature of the product next to the wall of the plastic package falls by about 18° C. to –16° C., and then quickly rises due to thermal transfer from the mixture of water and glycol having a higher temperature (+4° C.). At the time 1200 s, about 240 s after decompression, the dashed curve shows how the temperature of the product next to the wall of the plastic package has risen to about –6° C. The reason that the temperature of the product next to the wall of the plastic package falls more (about 18° C.) in decompression compared with its rise in decompression about (15° C.) is that the decompression process is quicker than the compression process, which means that a smaller heat exchange with the mixture of water and glycol occurs during decompression than during compression.

By the temperature of the product next to the wall of the plastic package during the high pressure treatment rising to a temperature above 0° C., the product will partly thaw, which can deteriorate the quality of the product and destroy it.

Figure 5:
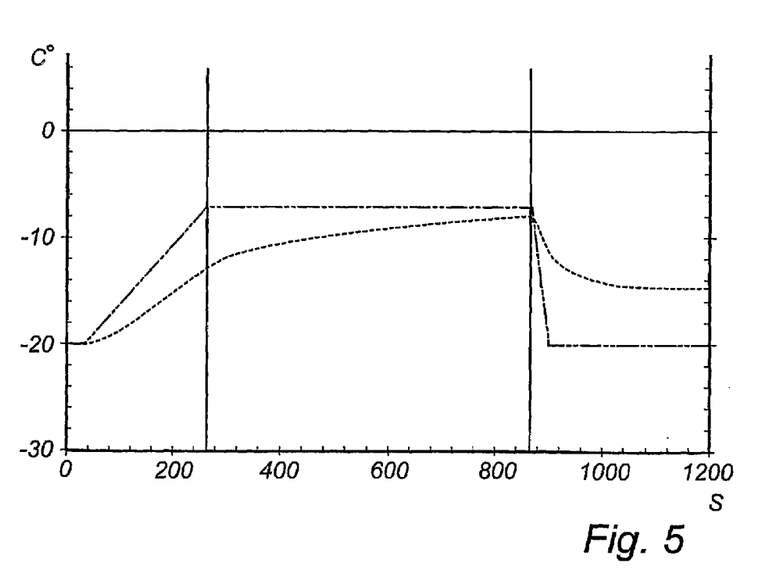
FIG. 5 shows a diagram of how the temperature of a product held in a container according to the invention is affected during a high pressure treatment.

FIG. 5 shows in a diagram similar to FIG. 4 how the temperature of a frozen product varies over time during high pressure treatment in an isostatic press according to the present invention comprising a closed insulated container. In the same way as in FIG. 4, a first double-dot-dashed curve shows the temperature of the product in the centre of the container and a second dashed curve the temperature of the product next to the inner wall of the container. The container is formed with an about 10 mm thick inner wall of stainless steel. Outside the inner wall, an about 10 mm thick insulation of EPDM (ethylene propylene rubber) is arranged and outside the insulation the container is provided with an about 2 mm thick stainless steel sheet. The container is about 1700 mm long and has a diameter of about 300 mm.

At the time 0 s when the container is placed in the pressure chamber, the container as well as the ethanol and the product in the container have a temperature of about –20° C. During pressurization of the pressure chamber of the isostatic press, the temperature of the product and the second pressure medium rises due to adiabatic temperature rise. The pressure is increased to a level of about 6000 bar which is kept constant for about 600 s The keeping of the constant pressure of 6000 bar is maintained from the time 260 s to the time 860 s, which in FIG. 5 is indicated by two vertical unbroken lines.

From the time 0 s when the container is placed in the pressure chamber to the time 40 s when the pressure chamber is pressurized, the temperature of both the product in the centre of the container and the product next to the inner steel wall of the container is only affected marginally.

At the time 240 s when the pressure has reached 6000 bar in the pressure chamber, the double-dot-dashed curve shows how the temperature of the product in the centre of the container has risen by about 13° C. to about −7° C. due to adiabatic heating. The dashed curve shows at the same time 240 s how the product next to the inner steel wall will emit heat to the inner steel wall, the temperature rising by about 7° C. about −13° C.

The double-dot-dashed curve shows how the temperature of the product in the centre of the container at the time 860 s when the pressure chamber begins to be decompressed has been insignificantly affected by the surroundings while keeping the pressure which lasts for about 600 s The dashed curve shows how heat transfer through the inner steel wall from the insulation and the mixture of water and glycol causes the temperature to rise over time in the product next to the inner steel wall while keeping the continuous pressure of 6000 bar. The temperature at the time 860 s when the pressure chamber begins to be decompressed after about 600 s of continuous pressure is about −7° C. at the inner steel wall, which is substantially the same temperature as that of the product in the centre of the container.

At the time 900 s when the pressure press has been decompressed, it is evident from the double-dot-dashed curve and the dashed curve that the product next to the inner steel wall has a higher temperature than the product in the centre of the container due to the fact that the product next to the inner steel wall is heated by the inner steel wall which has absorbed heat during the high pressure treatment, which heat remains after decompression. The temperature at the inner steel wall is at the time 1200 s, about 240 s after decompression, about −15° C. and in the centre of the container about −20° C. at the same time.

Since the temperature of the product at the inner steel wall, by counteraction of thermal transfer, does not at any time during the continuous keeping of the pressure exceed the temperature which the product in the centre assumes during this time, due to adiabatic temperature rise, it is avoided that the frozen product thaws anywhere in the container.

FIGS. 6a-f illustrate schematically a method for high pressure treatment of frozen products by means of an exemplifying embodiment of an isostatic press according to the invention.

Figures 6A, 6B, 6C:
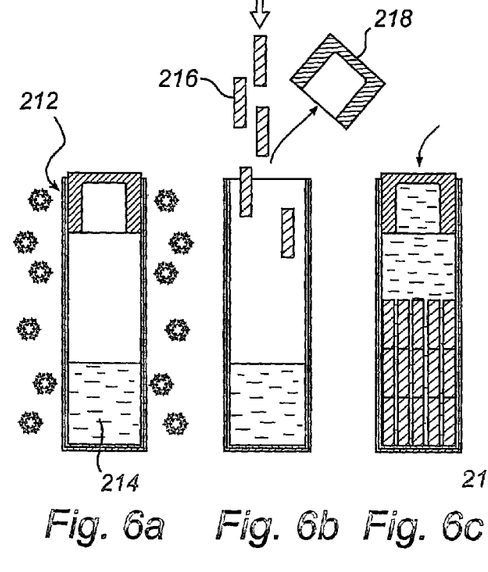
FIGS. 6a-f illustrate a method for high pressure treatment of a product by means of an isostatic press according to an embodiment of the invention.

FIG. 6a shows an insulated container 212 which is placeable in an isostatic press 210 according to the invention and contains said second pressure medium 214. The container 212 containing the pressure medium 214 is cooled to a temperature between about −10° C. and −25° C., which is usually carried out in a freezing chamber.

FIG. 6b shows that the frozen product 216 which is to be subjected to high pressure treatment is placed in the cooled container 212 which has substantially the same temperature as the frozen product 216. The container can be opened and closed by means of a lid, which in the shown embodiment is a pressure transferring loose piston 218. The placing of the product 216 in the cold container 212 is performed in a cold room, preferably a freezing chamber.

In FIG. 6c, the container 212 is closed after placing the product 216 which is to be subjected to high pressure treatment by means of an isostatic press 210 according to the invention, in the container 212. After the container 212 being closed, it is emptied by a valve (not shown) of a possible residual volume of air which remains after placing the product 216 in the container 212. The residual volume of air is discharged by the valve being opened, after which the contents of the container 212 are compressed by means of the loose piston 218, preferably manually. An indication that the residual volume of air is discharged can in such a case be that liquid escapes through the valve, after which the valve is closed. Having discharged the residual volume of air, the container 212 containing the product 216 and the pressure medium 214 is kept in a cold space, for example in a freezing chamber until the high pressure treatment is to be begun.

Figure 6D:
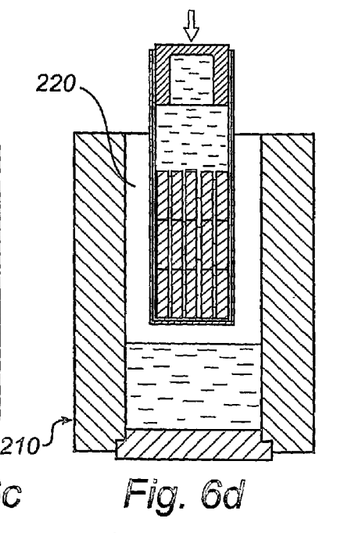

In FIG. 6d, the cooled container 212 containing the pressure medium 214 and the frozen product 216 is placed in a pressure chamber 220 of an isostatic press 210. After placing the container 212 in the pressure chamber 220 of the isostatic press 210, the isostatic press 210 is closed.

Figure 6E:
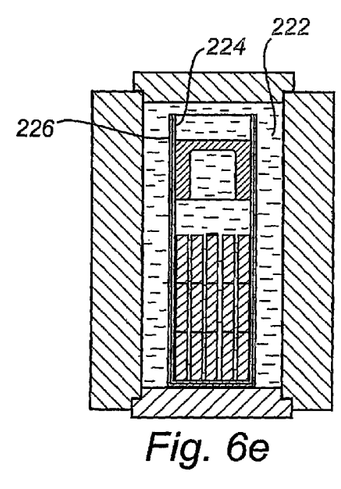

In FIG. 6e, the first pressure medium 222 in the pressure chamber 220 of the isostatic press 210 is pressurized, the pressure of the first pressure medium 222 in the pressure chamber 220 being transferred to the second pressure medium 214 in the container 212 through the loose piston 218. The product 216 is subjected to high pressure treatment at a pressure of 2000-15000 bar, preferably 2000-10000 bar, particularly 5000-7000 bar, for 0.5-20 min, preferably 0.5-10 min, particularly 2-7 min. The high pressure treatment of a product 216 in the insulated closed container 212 can be carried out as one or more successive pressure cycles. By using an isostatic press 210 according to the invention comprising a closed insulated container 212 which is placeable in the isostatic press, said container 212 absorbing emitted adiabatic heat both from the product 216 and the second pressure medium 214 at least next to the inner wall 224 of the container 212 as well as the insulation 226, the product 216 can be kept in a frozen state throughout the high pressure treatment.

Figure 6F:
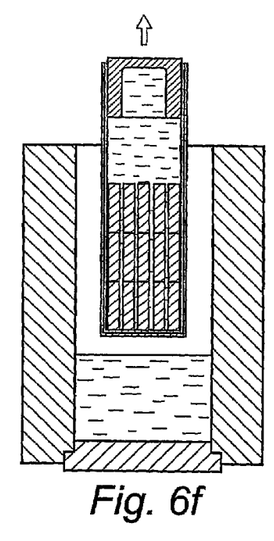

In FIG. 6f, the pressure chamber 220 is decompressed after the high pressure treatment. Decompression is carried out by the pressure of the first pressure medium 222 being lowered, the pressure of the second pressure medium 214 being lowered by the pressure difference relative to the first pressure medium 222 being eliminated by means of the loose piston 218. After decompression, the isostatic press 212 is opened, and the container 212 containing the frozen product 216 can be removed from the pressure chamber 220 of the isostatic press 210.

Although certain embodiments have been described above, the invention is not limited thereto. It will thus be understood that several modifications and variations can be provided without departing from the scope of the invention defined in the appended claims.

The invention claimed is:

1. A method for high pressure treatment of a product by means of an isostatic press comprising a pressure chamber adapted to hold a first pressure medium, comprising the steps of:

providing at least one closed container which holds a second pressure medium and a product whose temperature is below 0° C.;

placing the container in the pressure chamber of the isostatic press;

pressurizing the pressure chamber by means of the first pressure medium;

transferring a pressure change of the first pressure medium to the second pressure medium to subject the product held in the closed container to high pressure treatment; and keeping the temperature of the product below 0° C. throughout the high pressure treatment by absorbing heat which is generated by adiabatic temperature rise during the high pressure treatment.

2. The method as claimed in claim 1, further comprising keeping the product in a frozen state throughout the high pressure treatment.

3. The method as claimed in claim 2, further comprising, if the product reaches a temperature where there is a phase change from solid phase to liquid phase, keeping the product frozen throughout the high pressure treatment by utilizing consumption of melting heat.

4. The method as claimed in claim 1, further comprising counteracting thermal transfer between the first pressure medium and the second pressure medium by selecting a container provided with thermal insulation.

5. The method as claimed in claim 1, further comprising counteracting, during the high pressure treatment, by means of a body arranged in the container thermal passing of emitted adiabatic heat from the insulation, due to compression during high pressure treatment, to the second pressure medium.

6. The method as claimed in claim 5, further comprising absorbing said emitted adiabatic heat from the insulation by selecting a container where the body is positioned between the insulation and the second pressure medium, the body constituting at least part of the container wall.

7. The method as claimed in claim 1, further comprising transferring the pressure of the first pressure medium to the second pressure medium by compressing the second pressure medium in the container so that pressure equalization is achieved between the first pressure medium and the second pressure medium.

8. The method as claimed in claim 1, further comprising cooling the container and the second pressure medium to a temperature below 0° C.

9. The method as claimed in claim 8, further comprising placing in the cooled container the product having a temperature below 0° C.

10. The method as claimed in claim 1, further comprising discharging a possible residual volume of air from the container holding the product and the second pressure medium before the pressure chamber is pressurized.

11. The method as claimed in claim 1, further comprising subjecting the product to high pressure treatment for 0.5-20 min.

12. The method as claimed in claim 1, further comprising subjecting the product to high pressure treatment at a pressure of 2000-15000 bar.

13. The method as claimed in claim 1, further comprising decompressing the high pressure press and then removing the container from the pressure chamber after the high pressure treatment.

14. An isostatic press for high pressure treatment of a product having a temperature below 0° C., comprising:
  a pressure chamber adapted to contain a first pressure medium;
  a container which is placeable in the pressure chamber and which is adapted to hold the product and a second pressure medium; and
  the container being closable to keep the second pressure medium separated from the first pressure medium and being provided with a pressure transfer device for transfer pressure from the first pressure medium to the second pressure medium, and the container comprising a body which is made of a material having low adiabatic heat emission relative to adjoining substances, so that the body from adjoining substances absorbs heat which is generated by adiabatic temperature rise during the high pressure treatment.

15. The isostatic press as claimed in claim 14, wherein the body constitutes at least part of a container wall of the container.

16. The isostatic press as claimed in claim 15, wherein the container wall comprises an inner wall round the outside of which a substance in the form of an insulation is arranged to counteract thermal transfer between the first pressure medium and the second pressure medium, the body constituting at least part of the inner wall, said body counteracting thermal passing of adiabatic heat emission from the insulation, due to compression during the high pressure treatment, to the second pressure medium and the product.

17. The isostatic press as claimed in claim 16 wherein the container is arranged with an outer wall and the insulation is arranged between the inner and the outer wall.

18. The isostatic press as claimed in claim 16 wherein the inner wall of the container is substantially rigid and at least part of the pressure transfer device of the container is movably arranged relative to said inner wall to enable a change of volume of the second pressure medium for the purpose of eliminating a pressure difference between the first pressure medium and the second pressure medium.

19. The isostatic press as claimed in claim 16 wherein the inner wall is made of metal.

20. The isostatic press as claimed in claim 16 wherein the inner wall has a thickness which is at least 5 mm.

21. The isostatic press as claimed in claim 16 wherein the insulation is made of a polymer.

22. The isostatic press as claimed in claim 16 wherein the insulation has a thickness which is at least 5 mm.

23. The isostatic press as claimed in claim 14 wherein the pressure transfer device is arranged as a loose piston adapted to transfer a pressure change in the first pressure medium to the second pressure medium, and to separate the first pressure medium from fluid communication with the second pressure medium.

24. The isostatic press as claimed in claim 14 wherein the pressure transfer device is arranged as a flexible membrane adapted to transfer a pressure change in the first pressure medium to the second pressure medium and to separate the first pressure medium from fluid communication with the second pressure medium.

25. The isostatic press as claimed in claim 14 wherein a plurality of containers can be placed in the same pressure chamber of the isostatic press for simultaneous treatment of the product in each container.

26. The isostatic press as claimed in claim 14 wherein a valve is arranged on the container to enable discharge of a possible residual volume of air in the container when the container holds the product and the second pressure medium.

27. The isostatic press as claimed in claim 14 wherein the second pressure medium is a liquid with a freezing point below 0° C.

28. The isostatic press as claimed in any one claim 14 wherein the first pressure medium is a liquid.

29. A plant for high pressure treatment of products having a temperature below 0° C., comprising:
  a freezing device, such as a freezing chamber; and
  an isostatic press comprising a pressure chamber adapted to contain a first pressure medium, a container which is placeable in the pressure chamber and which is adapted to hold the product and a second pressure medium, the container being closable to keep the second pressure medium separated from the first pressure medium and being provided with a pressure transfer device for transfer pressure from the first pressure medium to the second pressure medium, and the container comprising a body which is made of a material having low adiabatic heat emission relative to adjoining substances so that the body from adjoining substances absorbs heat which is generated by adiabatic temperature rise during the high pressure treatment.

30. A container adapted to subject, by means of an isostatic press, a product having a temperature below 0° C., which is placeable in the container, to high pressure treatment, comprising:

a closure adapted to separate the inside of the container from the surroundings of the container;

a pressure transfer device for transferring pressure from the surroundings of the container to the inside of the container; and a body which is made of a material having low adiabatic heat emission relative to adjoining substances, so that the body from adjoining substances absorbs heat which is generated by adiabatic temperature rise during the high pressure treatment, wherein the body constitutes at least part of a container wall of the container and the container wall comprises an inner wall round the outside of which a substance in the form of an insulation is arranged to counteract thermal transfer between the surroundings of the container and the inside of the container, the body constituting at least part of the inner wall, said body counteracting thermal passing of adiabatic heat emission from the insulation, due to compression during the high pressure treatment, to the inside of the container.

31. The container as claimed in claim 30 wherein the container is arranged with an outer wall and the insulation is arranged between the inner and the outer wall.

32. The container as claimed in claim 30 wherein the inner wall of the container is substantially rigid and at least part of the pressure transfer device of the container is movably arranged relative to said inner wall to enable a change of volume of the inner volume of the container for the purpose of eliminating a pressure difference between the surroundings of the container and the inside of the container.

33. The container as claimed in claim 30, wherein the pressure transfer device is arranged as a loose piston adapted to transfer a pressure change of the surroundings of the container to the inside of the container and to separate the inside of the container from the surroundings of the container.

34. The container as claimed in claim 30 wherein the pressure transfer device is arranged as a flexible membrane adapted to transfer a pressure change of the surroundings of the container to the inside of the container, and to separate the inside of the container from the surroundings of the container.

35. The container as claimed in claim 30 wherein the inner wall is made of metal.

36. The container as claimed in claim 30 wherein the inner wall has a thickness which is at least 5 mm.

37. The container as claimed in claim 30 wherein the insulation is made of a polymer.

38. The container as claimed in claim 30 wherein the insulation has a thickness which is at least 5 mm.

39. The container as claimed in claim 30 wherein a valve is arranged on the container to enable discharge of a possible residual volume of air in the container when the container holds the product and a pressure medium.

40. The container as claimed in any one of claim 30 wherein the container is adapted to transfer, by the pressure transfer device, a liquid pressure from the outside of the container to a liquid on the inside of the container, said liquid having a freezing point below 0° C.

* * * * *